(12) United States Patent
Irie

(10) Patent No.: US 9,386,227 B2
(45) Date of Patent: Jul. 5, 2016

(54) FINDER APPARATUS FOR A CAMERA, FINDER DISPLAY CONTROLLING METHOD, AND STORAGE MEDIUM

(71) Applicant: CANON KABUSHIKI KAISHA, Tokyo (JP)

(72) Inventor: Yoshiaki Irie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/561,349

(22) Filed: Dec. 5, 2014

(65) Prior Publication Data

US 2015/0172551 A1    Jun. 18, 2015

(30) Foreign Application Priority Data

Dec. 16, 2013  (JP) ................. 2013-259279

(51) Int. Cl.
*H04N 5/222* (2006.01)
*H04N 5/225* (2006.01)
*H04N 5/232* (2006.01)
*G09G 3/34* (2006.01)

(52) U.S. Cl.
CPC ......... *H04N 5/23293* (2013.01); *G09G 3/3413* (2013.01); *G09G 3/3406* (2013.01); *G09G 2360/144* (2013.01)

(58) Field of Classification Search
CPC . H04N 5/23293; H04N 5/2354; H04N 9/097; H04N 5/23212; H04N 5/335
USPC ............... 348/339, 340, 344, 345, 333.01, 348/333.08, 333.09, 337, 338, 341
See application file for complete search history.

(56) References Cited

U.S. PATENT DOCUMENTS

| | | | |
|---|---|---|---|
| 5,485,241 A | 1/1996 | Irie et al. | |
| 5,541,400 A | 7/1996 | Hagiwara et al. | |
| 5,579,080 A | 11/1996 | Irie et al. | |
| 5,589,908 A | 12/1996 | Irie | |
| 5,600,399 A | 2/1997 | Yamada et al. | |
| 5,610,681 A | 3/1997 | Nagano et al. | |
| 5,634,141 A | 5/1997 | Akashi et al. | |
| 5,752,090 A | 5/1998 | Nagano et al. | |
| 5,761,543 A | 6/1998 | Yamada et al. | |
| 5,797,046 A | 8/1998 | Nagano et al. | |
| 5,926,655 A | 7/1999 | Irie et al. | |

(Continued)

FOREIGN PATENT DOCUMENTS

JP     2003-078785 A    3/2003

*Primary Examiner* — Sinh Tran
*Assistant Examiner* — Xi Wang
(74) *Attorney, Agent, or Firm* — Fitzpatrick, Cella, Harper & Scinto

(57) ABSTRACT

Provided is a finder apparatus for a camera, including: an optical finder to be provided with an optical image of an object; a display unit configured to display image information as an image; an optical path combining unit having a predetermined optical characteristic, and configured to optically combine the optical image provided to the optical finder and the image displayed on the display unit with each other in an optical path of the optical finder; and an image display processing unit configured to subject the image information to image display processing, in which, when the optical finder is not provided with the optical image of the object, the image display processing unit subjects the image information to first image display processing corresponding to the predetermined optical characteristic of the optical path combining unit.

4 Claims, 6 Drawing Sheets

(56) References Cited

U.S. PATENT DOCUMENTS

| | | | | |
|---|---|---|---|---|
| 6,097,894 A * | 8/2000 | Suda | ............ | G03B 17/20 396/121 |
| 6,670,992 B2 | 12/2003 | Irie | | |
| 2010/0027985 A1* | 2/2010 | Yokoyama | ............ | G03B 13/06 396/384 |
| 2013/0194479 A1* | 8/2013 | Jogetsu | ............ | G03B 13/04 348/333.08 |
| 2013/0271436 A1* | 10/2013 | Shiomi | ............ | G09G 3/3648 345/204 |
| 2013/0279013 A1* | 10/2013 | Edwards | ............ | G02B 27/0189 359/630 |
| 2014/0168499 A1* | 6/2014 | Sasaki | ............ | H04N 5/2251 348/341 |
| 2014/0313244 A1* | 10/2014 | Yang | ............ | G09G 5/10 345/694 |
| 2015/0124131 A1* | 5/2015 | Misawa | ............ | H04N 5/23293 348/294 |

\* cited by examiner

FINDER APPARATUS FOR A CAMERA, FINDER DISPLAY CONTROLLING METHOD, AND STORAGE MEDIUM

BACKGROUND OF THE INVENTION

1. Field of the Invention

The present invention relates to a finder apparatus for a camera. In particular, the present invention relates to a finder apparatus for a single-lens reflex camera with which an image in an electronic view finder is superimposed on an optical finder image, to thereby enable both the images to be simultaneously visually recognized.

2. Description of the Related Art

In recent years, even a single-lens reflex camera can carry out still image photographing and moving image photographing by using so-called live view display for displaying continuous photographing images by an imaging element on a display unit (display). In this case, a main mirror for guiding light from an object to an optical finder of the single-lens reflex camera is withdrawn from an optical path for the photographing. As a result, a photographer cannot visually recognize an optical finder image, and instead, the photographer views an object image by using the display unit disposed on a camera back surface. However, it is troublesome for the photographer to change a photographer's balance looking into the camera between the optical finder and the display unit. In addition thereto, carrying out the photographing while viewing the display unit with the single-lens reflex camera makes it difficult for the photographer to keep the upper arms holding the camera to the body, which is a drawback leading to the photographing in the photographer's balance easy to vibrate an imaging apparatus. In particular, the hand-held photographing using a telephoto lens without any tripod has been impractical.

In order to cope with this problem, a camera in which the optical finder and the electronic view finder can be switched over has heretofore been proposed. When the optical finder and the electronic view finder can be switched over in the same optical path, the live view display photographing and the moving image photographing using the electronic view finder can be carried out. Moreover, because the photographer's balance looking into the finder of the camera is not different from that in a normal state of using the optical finder, the camera can be held in the ideal posture, to thereby carry out the photographing.

The most realistic unit as a structure which enables the photographer of the camera to observe both the optical finder and the electronic view finder is a structure in which a semi-transmissive mirror (semi-transmissive prism) is disposed between an exit surface of a penta-prism serving as one member of the optical finder, and an eyepiece. With this, a display optical path of the electronic view finder can be introduced from the middle of the optical path of the optical finder.

In addition, in Japanese Patent Application Laid-Open No. 2003-78785, there is proposed a finder apparatus with which an electronic view finder image is displayed so that it is superimposed on the optical finder image. Specifically, a liquid-crystal filter is disposed in the finder optical path so that an amount of light of an optical object image is variable, and brightness of a display panel of the electronic view finder is changed, to thereby enable an amount of light of an electronic image to be superimposed to be changed. In addition, in Japanese Patent Application Laid-Open No. 2003-78785, there are described various display state modes such as an optical finder mode in which no electronic image is displayed, a superimpose display mode in which an electronic image is displayed so that it is superimposed on an optical image, and an image confirming mode in which data on only an electronic image obtained through the past photographing is read out to display only the electronic image. In Japanese Patent Application Laid-Open No. 2003-78785, it is also disclosed that the optimum finder display is realized depending on those modes, and a structural example in which this structure is applied to the single-lens reflex camera.

In Japanese Patent Application Laid-Open No. 2003-78785, a structural example of a finder of the single-lens reflex camera is described as follows with which the image in the electronic view finder is displayed so that it is superimposed on the optical finder image, and hence both the images can be simultaneously visually recognized.

(1) In Optical Finder Mode

In an optical finder mode in which no electronic image is displayed, a control circuit stops an imaging element and a signal processing circuit. As a result, an electronic image display function thoroughly becomes a non-operation state. At this time, a liquid-crystal filter is set to a transparent state (having transmissivity of 100%).

(2) In Superimpose Display Mode

In a superimpose display mode in which the electronic image is displayed so that it is superimposed on the optical image, the imaging element, the signal processing circuit, and the like are continuously operated to display a moving image on a liquid crystal monitor. At this time, the liquid-crystal filter is set to a semi-transmissive state (having transmissivity of 50%). In this case, when the brightness of the object is low, it is expected that the optical image cannot be visually recognized in some cases. On the other hand, it is also expected that the reduction of 50% is insufficient. Then, the brightness of the object is measured and the transmissivity is changed in accordance with the value of the brightness, and hence a stable finder image is always obtained. In addition, the balance may be relatively kept by adjusting a light amount of a backlight unit.

(3) In Reproduction Mode

In the image confirming mode in which the data on the electronic image obtained through the past photographing is read out to display only the electronic image, the imaging element is stopped, and the data on the last photographing image is read from an image memory into the signal processing circuit to display the still image on the liquid crystal monitor. At this time, the liquid crystal finder is set to a non-transparent state (having the transmissivity of 0%).

As described above, in Japanese Patent Application Laid-Open No. 2003-78785, there is proposed the control under which the transmissivity of an object light dimming unit including a liquid-crystal filter is changed in accordance with the various finder display modes of the camera, and at the same time, the light amount of a backlight unit of the liquid crystal monitor is also changed, to thereby provide the optimum finder display. However, the light dimming control by the liquid-crystal filter is insufficient for obtaining an optical finder image having an excellent appearance quality from a viewpoint of the characteristics of the liquid crystal device itself. In a general TN liquid crystal panel, in principle, the transmissivity of 50% or more cannot be obtained because a polarization plate is used. The sight of the optical object image becomes dark in any of the photographing environments other than the outside, namely, a high-brightness photographing environment, and hence the visibility of the photographing object is reduced.

In addition, when a PN liquid crystal (polymer-dispersed liquid crystal) panel is used in the light dimming unit, the transmissivity at drive of the liquid crystal is as high as approximately 90%. However, there is caused a problem in that when the light is diffused and dimmed at non-drive of the liquid crystal, the optical image itself is diffused, and hence the object image is not sharply viewed. In addition, using the liquid crystal device leads to a problem of the increase in size and cost of the camera on which the liquid crystal device is to be mounted.

SUMMARY OF THE INVENTION

In view of the foregoing, it is therefore an object of the present invention to provide a finder apparatus capable of solving the problems in the related art in a single-lens reflex camera with which an image in an electronic view finder is superimposed on an optical finder image, to thereby enable both the images to be simultaneously visually recognized. Specifically, it is an object of the present invention to provide a finder apparatus with which a superimposed display can be visually recognized without reducing an appearance quality of an optical finder image nor burying the superimposed display in brightness of an optical object image.

In order to achieve the above-mentioned object, according to one embodiment of the present invention, there is provided a finder apparatus, including: an optical finder to be provided with an optical image of an object; a display unit configured to display image information as an image; an optical path combining unit having a predetermined optical characteristic, and configured to optically combine the optical image provided to the optical finder and the image displayed on the display unit with each other in an optical path of the optical finder; and an image display processing unit configured to subject the image information to image display processing, in which, when the optical finder is not provided with the optical image of the object, the image display processing unit subjects the image information to first image display processing corresponding to the predetermined optical characteristic of the optical path combining unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Now, an exemplary embodiment of the present invention is described in detail with reference to FIGS. 1 to 8. Note that, in FIGS. 1 to 8, the same constituent elements are represented by the same numerals or symbols, and a repeated description is omitted unless otherwise required.

Figure 1:
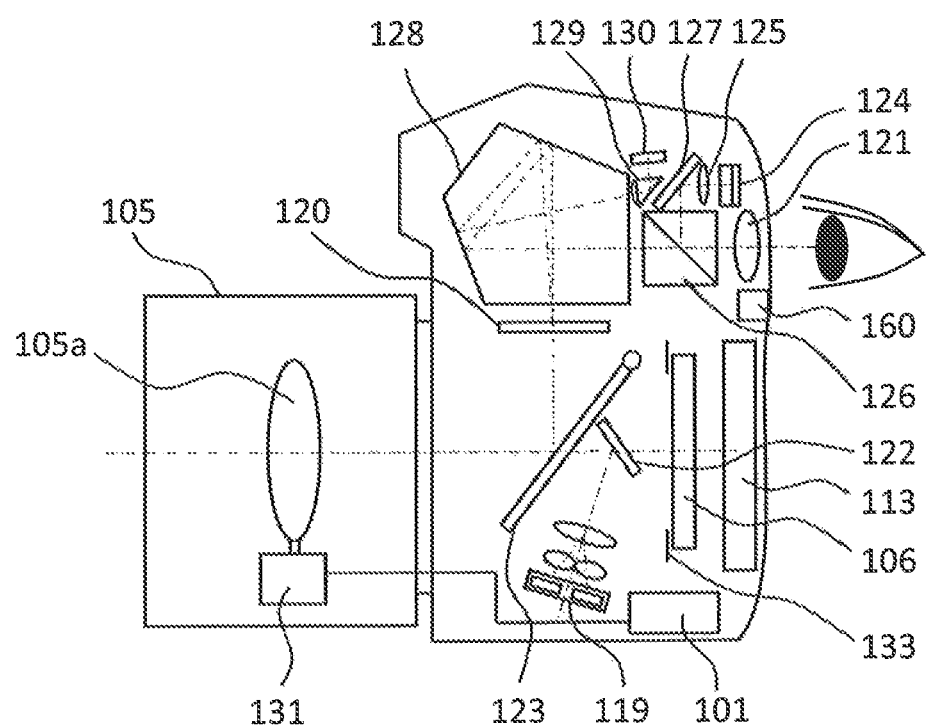
FIG. 1 is a view illustrating a schematic structure of an imaging apparatus according to an embodiment of the present invention.

FIG. 1 is a view illustrating a schematic structure of an imaging apparatus as a digital single-lens reflex camera to which the present invention is applied.

In FIG. 1, a central processing unit (CPU) 101 controls an operation of the digital single-lens reflex camera. A photographing lens 105 forms an image from a photographing object light on an imaging element 106. Note that, although a photographing lens 105 illustrated in FIG. 1 is expressed as a single lens 105a for the sake of convenience, the photographing lens 105 actually includes a plurality of lenses.

A focus detection plate (hereinafter referred to as "focus plate") 120 is placed on an image formation plane (primary image formation plane) equivalent to an image formation plane of the imaging element 106 of the photographing lens 105. Light corresponding to an object image is reflected by a main mirror 123 to be formed as a primary image on the focus plate 120. A photographer can view this object image through a penta-prism 128 and an eyepiece 121. In such a manner, a finder apparatus according to the embodiment of the present invention adopts an optical finder structure using a so-called TTL system.

On the other hand, the main mirror 123 is a semi-transparent mirror. A part of a light flux which has been transmitted through the main mirror 123 is guided to a focus detection unit 119 through a sub-mirror 122 to be used for a focus detection operation using a well-known method of detecting a phase difference. The focus detection unit 119 can detect focal points with respect to a plurality of areas of a photographing screen.

A photometric sensor 130 can detect brightness in a plurality of regions of the object image formed on the focus plate 120 by a photometric lens 129.

When the photographer depresses a release switch 214 (FIG. 2), the main mirror 123 is withdrawn from an optical path of the photographing lens 105. On the other hand, an amount of the light of the optical object image condensed by the photographing lens 105 is controlled by a focal plane shutter 133, and the optical object image is then formed on the imaging element 106. Then, the optical image of the object is converted into an image signal through photoelectric conversion and is then subjected to image processing. After that, the resulting image signal is recorded as the photographing image in a recording medium, and is displayed as the photographing image on a display unit 113 of a TFT display device.

Although the foregoing is a basic operation for normal photographing of a still image, the imaging apparatus can also carry out the live view photographing and the moving image photographing in addition to the still image photographing.

Here, the live view photographing means the photographing in which the main mirror 123 is withdrawn from the optical path for the photographing, photographing images of the object continuously imaged by the imaging element 106 with the shutter 133 in an open state are displayed on the display unit 113, and the photographer photographs the still image at an arbitrary timing while he/she observes this display. The moving image photographing is such that a format of the live view photographing is converted into a moving image format at an arbitrary timing, and the moving image is recorded.

In the general single-lens reflex camera including the optical finder, if the main mirror 123 is withdrawn from the optical path of the photographing lens 105 during the photographing as described above, the optical finder enters a light blocked state, and hence the object to be photographed cannot be viewed. On the other hand, in the imaging apparatus in the embodiment, the electronic view finder including an in-finder display unit 124 is disposed in the middle of the optical path of the optical finder. Therefore, even if the main mirror 123 is withdrawn from the optical path for the photographing, the object image displayed on the in-finder display unit 124 can be confirmed. The in-finder display unit 124 is a high polysilicon TFT display panel having a small XGA (1,024 pixels× 768 pixels) size.

With the above-mentioned structure, the photographer of the imaging apparatus in the embodiment observes the object by using the optical finder when the normal photographing of the still image is carried out, but even when the live view still image photographing, the moving image photographing, or the reproduction of the photographing image is carried out, he/she can observe the object by using the optical finder. As a result, while keeping the photographer's balance looking into the optical finder, the photographer can observe the display of the electronic image by using the in-finder display unit 124, that is, can observe the object by using the so-called electronic view finder.

Figure 7:
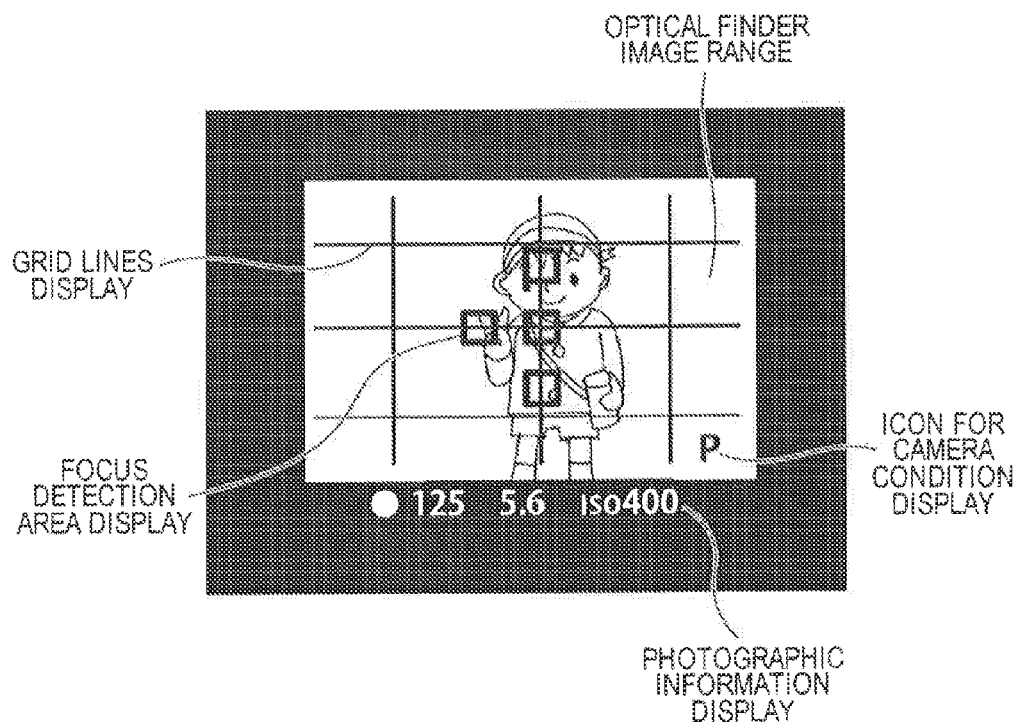
FIG. 7 is a view showing an example of an image displayed on a finder apparatus according to the embodiment of the present invention.

In addition, so-called superimposition display can be carried out, which displays the electronic view finder image so as to be optically superimposed on the optical image of the photographing object even when the main mirror 123 is located within the optical path for the photographing, that is, even when the optical finder is usable in the still image photographing state, as illustrated in FIG. 7. FIG. 7 shows an example of the superimposition display in the finder apparatus of the imaging apparatus according to the embodiment. In this case, a focus detection region, grid lines for determining a composition, an icon representing a setting state of the camera, and the like are displayed on the in-finder display unit 124. In addition, the in-finder display unit 124 can be extended to the outside of the optical object visual field, to thereby dispose and display, as the image information, the photographing information or the like such as a shutter speed, a lens iris value, and an ISO sensitivity value.

In addition, the imaging apparatus according to the embodiment is configured in such a way that whether the images continuously imaged by the imaging element 106 are displayed on the in-finder display unit 124 or on the display unit 113 is automatically selected by the camera. As an example, an eye detection sensor 160 for detecting whether or not the photographer looks into the finder is provided in the vicinity of the eyepiece 121, and it is determined whether or not the photographer looks into the finder of the camera in accordance with an output from the eye detection sensor 160. When it is determined that the photographer looks into the finder of the camera, the photographing image is displayed on the in-finder display unit 124. On the other hand, when it is determined that the photographer does not look into the finder of the camera, the image is displayed on the external display unit 113.

Figure 8:
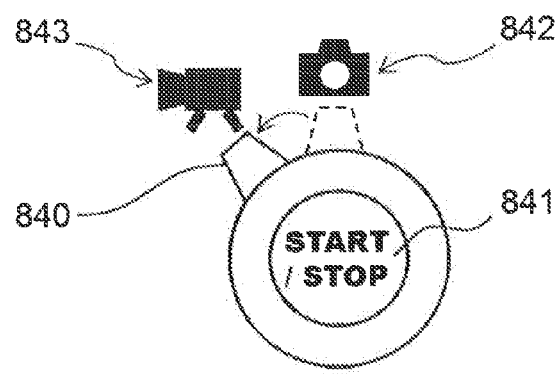
FIG. 8 is a view illustrating a live view/moving image photographing manipulating member of the imaging apparatus according to the embodiment of the present invention.

FIG. 8 illustrates a live view switch 840 and a moving image photographing switch 841 which are disposed in an exterior unit of the imaging apparatus. The live view switch 840 is a revolving switch. When a protrusion of the live view switch 840 is located at a position of a photographing mode icon 842, the normal still image photographing mode using the optical finder is indicated. On the other hand, when the protrusion is moved to the position of an icon 843, the photographing mode of the imaging apparatus is set to the live view photographing mode. In addition, when the moving image start/stop switch 841 is depressed in the live view photographing mode, the moving image photographing/recording is started. When the moving image start/stop switch 841 is depressed again, the moving image photographing is stopped. Note that, a concrete description about the optical finder, the electronic view finder, and the superimposition display as the composite display of the optical finder and the electronic view finder according to the present invention is described later.

Figure 2:
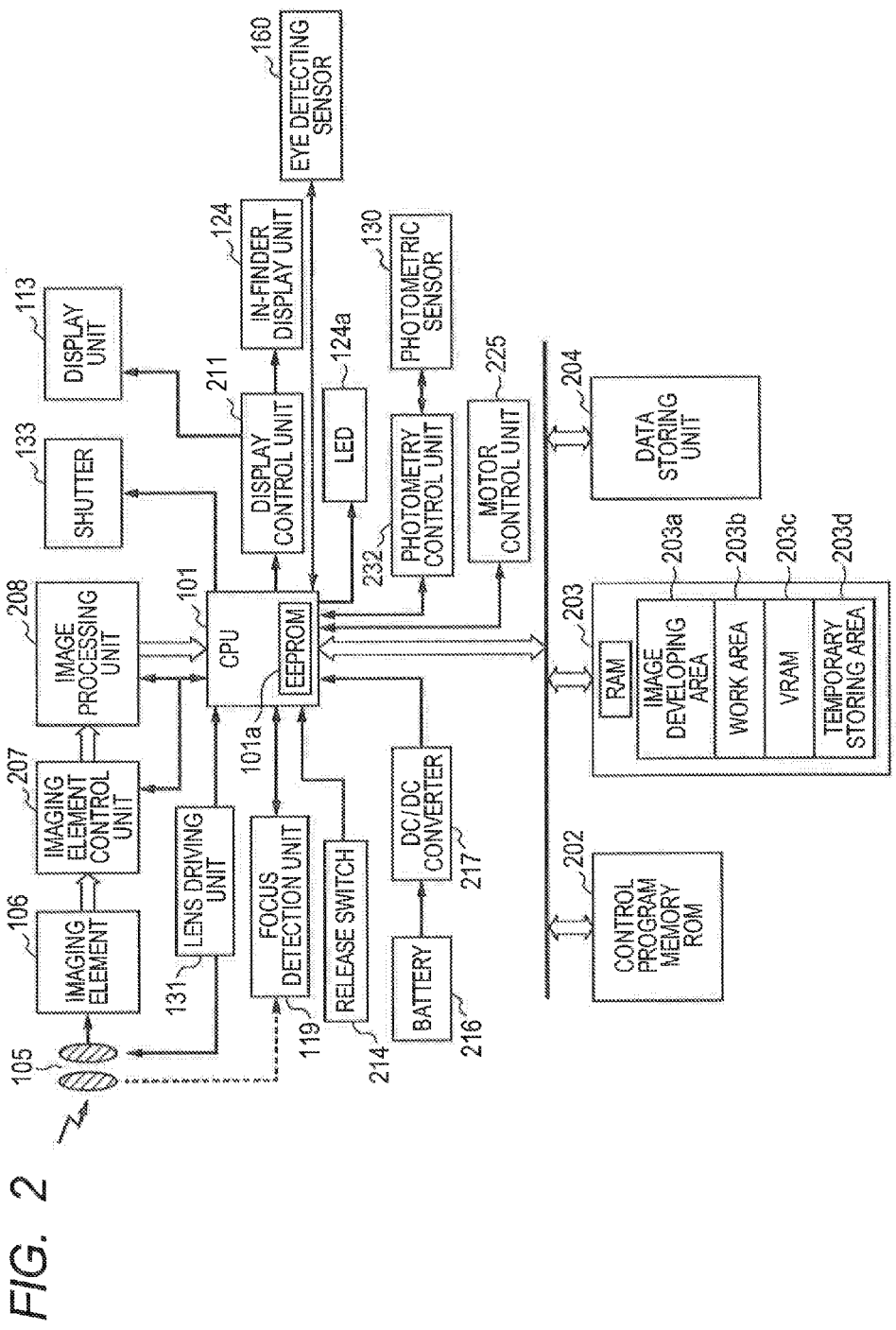
FIG. 2 is a block diagram illustrating a structure of the imaging apparatus according to the embodiment of the present invention.

FIG. 2 is a block diagram illustrating a schematic structure of the imaging apparatus according to the embodiment of the present invention. In FIG. 2, the CPU 101 described above includes an EEPROM 101a as a non-volatile memory. A read only memory (ROM) 202 in which a control program is stored, a random access memory (RAM) 203, and a data storing unit 204 are connected to the CPU 101, to thereby configure a control system. In addition, an image processing unit 208, a display control unit 211, a release switch 214, a DC/DC converter 217 for supplying electric power are connected to the CPU 101. In addition, an imaging element control unit 207 and the imaging element 106 are connected to the image processing unit 208. The imaging element 106 has the number of effective pixels of approximately ten million pixels (3,888 pixels×2,592 pixels).

Each of the display unit 113 and the in-finder display unit 124 which are provided on an exterior back side of the imaging apparatus and in the finder, respectively, is a TFT color liquid crystal display unit which can display a thinning-out processed image obtained through thinning-out processing lengthwise and crosswise with respect to the image imaged by the imaging element 106. The display control unit 211 drives the display unit 113 and the in-finder display unit 124 in order to display the still image and the moving image which are imaged by the imaging element 106. A motor control unit 225 controls a plurality of motors provided inside the camera for mirror driving or the like in response to an instruction issued from the above-mentioned CPU 101. In addition, electric power is supplied from a battery 216 to the DC/DC converter 217.

The CPU 101 carries out various kinds of control based on a control program stored in the ROM 202. Such control includes processing of reading the photographing image signal output from the image processing unit 208 to transfer the photographing image signal to the RAM 203, and processing of similarly transferring the data from the RAM 203 to the display control unit 211. In addition, such control also includes processing of JPEG-compressing the image data and storing the JPEG-compressed image data in the data storing unit 204 in a file format. In the case of the moving image data, after the similar processing, the moving image data compressed to a file of an MOV format is stored in the data storing unit 204. In addition, the CPU 101 issues instructions to change the number of pixels for obtaining data and the digital image processing to the imaging element 106, the imaging element control unit 207, the image processing unit 208, the display control unit 211, and the like.

A focus detection control unit 119 includes a pair of line CCD sensors for focal point detection. The focus detection control unit 119 A/D-converts a voltage obtained from a line sensor, and sends the resulting digital voltage to the CPU 101. In addition, the focus detection control unit 119 also carries out control for accumulation time of the line sensor and auto-gain control (AGC) in accordance with an instruction from the CPU 101. In addition, various kinds of processing such as issuing of an instruction for the photographing operation through manipulation of the release switch 214 and outputting of the control signal for controlling the supply of electric power to the elements to the DC/DC converter 217 are also carried out under the control by the CPU 101.

The RAM 203 includes an image developing area 203*a*, a work area 203*b*, a VRAM 203*c*, and a temporary storing area 203*d*. The image developing area 203*a* is used as a temporary buffer for temporarily storing therein the data on the photographing image (YUV signal) sent thereto from the image processing unit 208, and the JPEG-compressed image data read out from the data storing unit 204. In addition thereto, the image developing area 203*a* is also used as a work area dedicated for image processing such as image compression processing and image decompression processing. The work area 203*b* is a work area for the various programs. The VRAM 203*c* is used as a VRAM for storing therein the display data to be displayed on the display unit 113. In addition, the temporary storing area 203*d* is an area for temporarily storing therein the various data.

The data storing unit 204 is configured as a flash memory for storing therein the photographing image data obtained through the JPEG compression by the CPU 101 or the MOV-format moving image data in a file format. The imaging element 106 can output the pixel data obtained through the thinning in the horizontal direction and in the vertical direction in accordance with a resolution conversion instruction issued from the CPU 101. The imaging element control unit 207 includes a timing generator for supplying a transfer clock signal and a shutter signal to the imaging element 106, and a circuit for executing denoising and gain processing for a CCD output signal. In addition thereto, the imaging element control unit 207 includes an A/D conversion circuit for converting an analog signal into a 10-bit digital signal, and a circuit for executing the pixel thinning processing in accordance with the resolution conversion instruction issued from the CPU 101 in order to carry out the live view display on the display unit 113 and the in-finder display unit 124, and the moving image photographing.

In addition, the image processing unit 208 is a processing unit for executing image processing such as gamma conversion, color space conversion, white balance, and flash compensation for the 10-bit signal output from the imaging element control unit 207, and outputting a 8-bit signal in a YUV (4:2:2) format. The display control unit 211 receives YUV digital image data transferred thereto from the image processing unit 208, or the YUV digital image data obtained by carrying out JPEG-decompression for the image file of the data storing unit 204, and converts the YUV digital image data into RGB signals. The display control unit 211 (image display processing unit) executes processing for outputting the RGB signals obtained through the conversion to the display unit 113 or the in-finder display unit 124.

Moreover, the CPU 101 controls the eye detecting unit 160 for detecting whether or not the photographer looks into the finder of the camera, and a current of an LED 124*a* as a backlight unit for determining the display brightness of the in-finder display unit 124.

The release switch 214 is a switch for instructing a start of the photographing operation. The release switch 214 has two-step depression switch positions of a release button serving as a camera manipulation member (not shown). By detecting the first step position (SW1ON), a photographing preparation operation such as photometry and a focal point detecting operation is carried out. By detecting the second step position (SW2ON), the photographing of the object and the operation for recording the image signal are carried out.

A photometry control unit 232 controls the driving of the photometric sensor 130 in accordance with an instruction issued from the CPU 101, to thereby fetch a signal of the object brightness and send data on the signal of the object brightness to the CPU 101. The CPU 101 calculates optimum exposure of the camera based on this information, and controls the shutter speed of the camera and the stop of the photographing lens, to thereby attain the optimum exposure.

A rechargeable secondary battery or dry cell 216 is provided. The DC/DC converter 217 receives electric power supplied from the battery 216, creates a plurality of kinds of electric power through the boosting and regulation, and supplies the electric power having voltages necessary for the units, including the CPU 101. The DC/DC converter 217 is configured so as to control the start and stop of supply of the voltages in accordance with control signals issued from the CPU 101.

Next, a detailed description about the optical finder and the electronic view finder is made.

Figure 3:
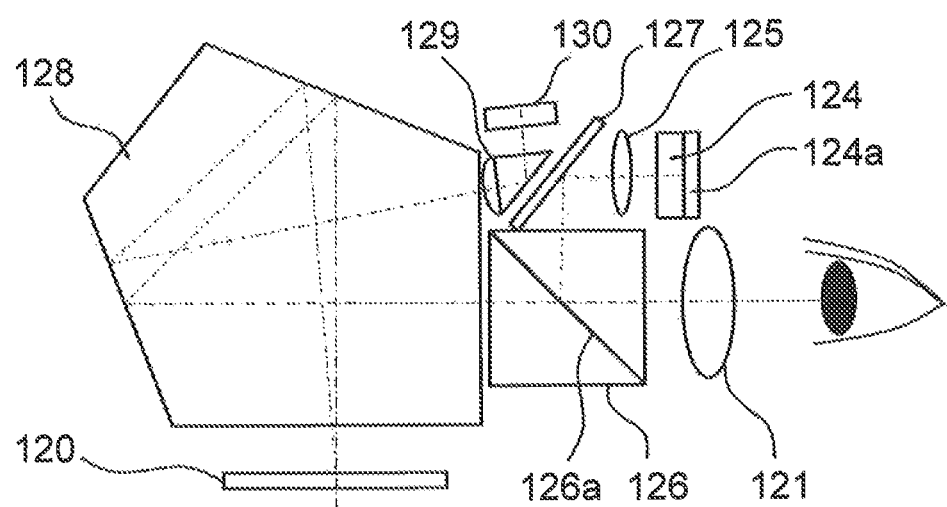
FIG. 3 is an enlarged view illustrating details of a structure of a finder unit of the imaging apparatus according to the embodiment of the present invention.

FIG. 3 is an enlarged view of details of the finder unit of the imaging apparatus illustrated in FIG. 1. In FIG. 3, the optical finder uses the eyepiece 121 to enlarge the object image projected on the focus plate 120 by the photographing lens 105. The eyepiece 121 is shared between the optical finder and the electronic view finder. An EVF lens 125 and an EVF mirror 127 for folding the optical path are disposed so that the diopter thereof matches the diopter of the in-finder display unit 124 located in the optical path at a position different from that of the focus plate 120. Note that, although the eyepiece 121 normally includes a plurality of lenses in order to suppress various kinds of optical aberration, the eyepiece 121 in this case includes a single lens for the sake of simplicity.

An optical path combining prism (optical element) 126 is an optical path combining unit for superimposing the image on the in-finder display unit 124 and the image on the optical finder on each other. The optical path combining prism 126 includes two triangular prisms bonded together. A junction reflective plane 126*a* of one triangular prism is a dichroic mirror (a wavelength-selective mirror having predetermined optical characteristics) formed of a multi-layer thin film. Although a part of an amount of light from the photographing object is attenuated by the dichroic mirror 126*a*, almost all the light reaches the eye of the photographer.

The image displayed on the in-finder display unit 124 is illuminated by a white backlight LED 124*a*, and a part of the light is reflected by the dichroic mirror 126*a* to enter the eye of the photographer. In the live view photographing or in the moving image photographing, the main mirror 123 is withdrawn from the optical path for the photographing, and hence the object light from the photographing lens 105 does not reach the eye of the photographer. In other words, the optical finder is disabled. However, the photographer can view the object image displayed on the in-finder display unit 124 through the eyepiece 121, and hence the finder unit can function as the electronic view finder.

Figure 6:
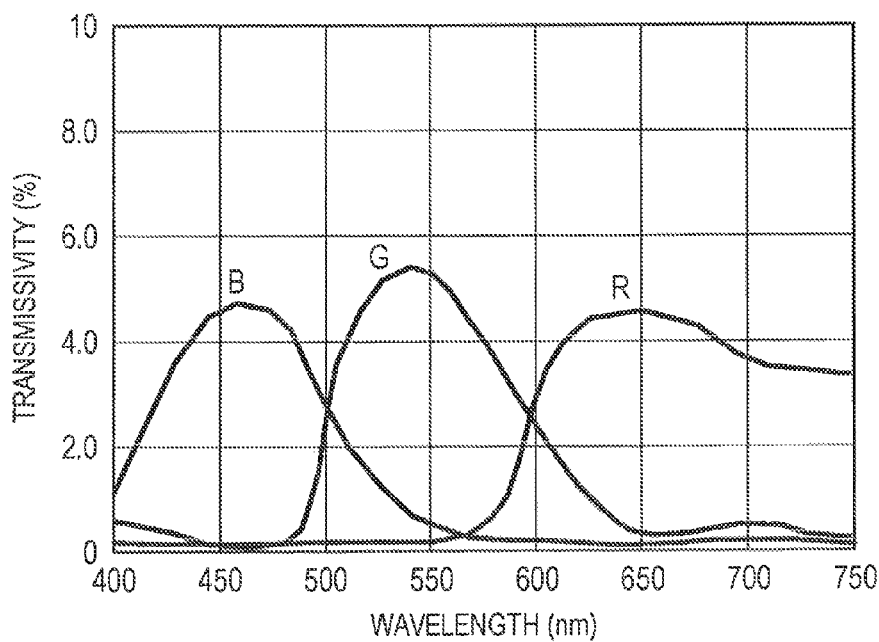
FIG. 6 is a graph showing spectral transmissivity of a TFT display.

A semi-transmissive mirror (prism) is generally used for a reflective plane as the optical path combining unit. However, in order to prevent the reduction of the object light amount in the optical finder from becoming remarkable, which is the characteristic function of the single-lens reflex camera, it is conceivable that the transmissivity in the visible region of the semi-transmissive mirror is set to 70% or more. In this case, the amount of light from the in-finder display unit 124 utilizing the reflection from the semi-transmissive mirror reaches the eye of the photographer by only 30% or less. On the other hand, as shown in FIG. 6, the transmissivity of the TFT display panel used in the in-finder display unit 124 is generally as low as 10% or less. Hence, it is understood that the light on the display panel which enters the eye of the photographer is transmitted at very low energy efficiency. Nevertheless, when the object light in the optical finder is blocked as in the case of the live view photographing, if the light emitting amount of the backlight LED 124a is, for example, doubled, such display brightness that poses no problem in practice can be obtained. However, in a case where the superimposed display is carried out in the display of the in-finder display unit 124, when the object is located outside and is bright, unless the brightness is further increased, the superimposed display is buried in the high-brightness optical object image. As a result, the in-finder display unit 124 cannot be visually recognized. Then, if the light emitting amount of the backlight LED 124a is further increased, there arise problems such as an increase in power consumption and an increase in heat generation. Therefore, increasing the display brightness has a limit.

On the other hand, the display of the focus detection region, for example, having a rectangular frame, or the like which is optically superimposed within the optical finder reflex view to obtain the superimposed display is desirably carried out with a red color. The reason for this is because a stimulus of the red color is strong with respect to visual characteristics of the human being. In other words, because less photographing objects have the strong stimulative red color, the display of the red color can be clearly distinguished from the object optical image.

On the other hand, the visibility of the human being has a feature in that its peak is at a green color, and the sensitivity to the red color is low. Therefore, in order to carry out the superimposed display by being superimposed on the optical object image on the TFT display panel according to the present invention, it is important that the display brightness of the red color is especially increased so that the superimposed display is not buried in the outside bright optical object image.

Figure 5:
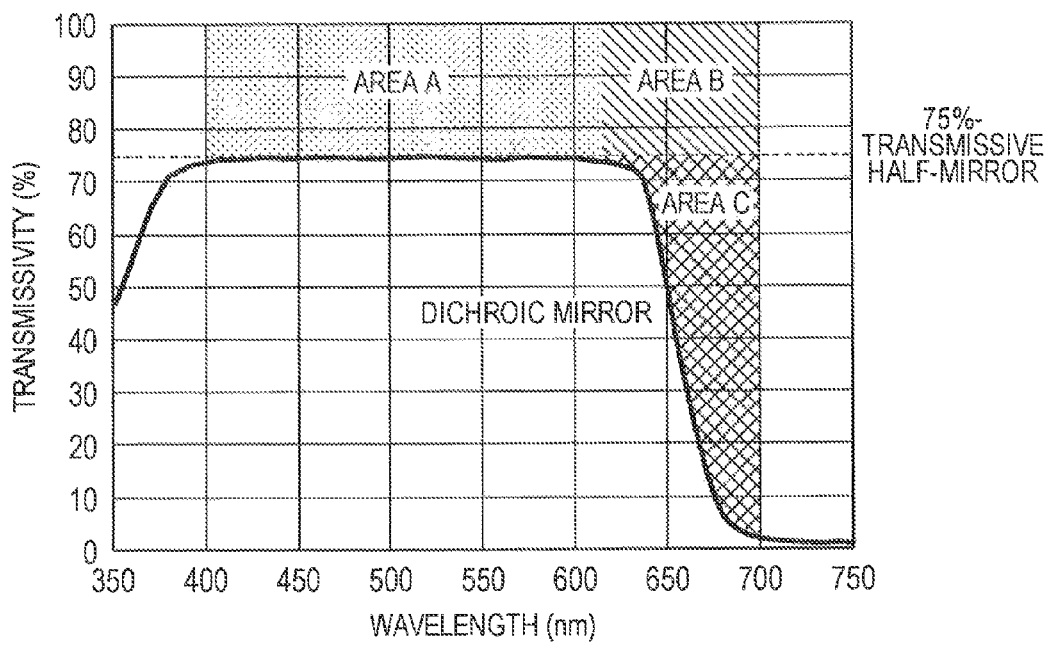
FIG. 5 is a graph showing spectroscopic characteristics of a dichroic mirror.

FIG. 5 is a graph showing spectral transmissivity (incidence of ray at 45°) as the optical characteristics of the dichroic mirror 126a. In the dichroic mirror 126a, the transmissivity of the semi-transmissive mirror which is normally used in the optical path combining is constant in a visible light wavelength range of from 400 nm to 700 nm, whereas the transmissivity of the semi-transmissive mirror is approximately constant at 75% in the wavelength range of from 400 nm to 630 nm. However, the dichroic mirror 126a has such characteristics that on the long wavelength side exceeding 630 nm, the transnmissivity is abruptly reduced to 50% at 650 nm and to approximately 1% at 700 nm. As described above, the visibility of the human being is in the range of from 400 nm to 700 nm, and the visibility is reduced as the visible light wavelength is closer to 700 nm. Therefore, when the object light in the optical finder which has entered through the photographing lens is transmitted through the dichroic mirror 126a, although the red color having a light amount reduced to some degree reaches the eye of the photographer, the photographer can observe the object image without being bothered by a difference with the color of the object.

On the other hand, the display light in the in-finder display unit 124 is reflected by the above-mentioned dichroic mirror 126a to become the display light following the spectral reflectivity as a value of "100% of the spectral transmissivity-transmissivity (%)", to thereby enter the eye of the photographer. If the semi-transmissive mirror having the transmissivity of 75% is used as the reflective member for combining the optical path, the amount of light whose transmissivity is constant at 25% over the entire visible range of from 400 nm to 700 nm enters the eye of the photographer in a region A+a region B in FIG. 5. On the other hand, in the embodiment, the reflectivity of the red color of the display light can be increased because the dichroic mirror is adopted in the optical path combining. In other words, if it is assumed that the red color in the visible range has the wavelength range of from 610 nm to 700 nm, the amount of display light having the region A+the region B+a region C which is obtained by adding the region C as the wavelength band of the red color to the amount of light (25%) obtained by using the above-mentioned semi-transmissive mirror enters the eye of the photographer. If the two cases are compared to each other with respect to the light amount of the red color, although the visibility of the human being also needs to be taken into consideration, the light amount from the dichroic mirror can be expected to be appropriately double to the light amount from the semi-transmissive mirror. Therefore, the display of the focus detection region superimposed on the optical object image can be carried out with the bright red color.

On the other hand, however, in the case of other displays than the superimposition display, that is, the live view display or the display of reproduction of the photographing image, the moving image or the still image is observed as the image in which the red color is emphasized, and hence a problem arises in that the color reproducibility is not kept.

Then, the imaging apparatus of the present invention copes with such a problem by changing image signal correction processing for the image which is displayed on the in-finder display unit 124 depending on states (modes) of the display concerned in the in-finder display unit 124. This structure is now described with reference to a flow chart of FIG. 4.

Figure 4:
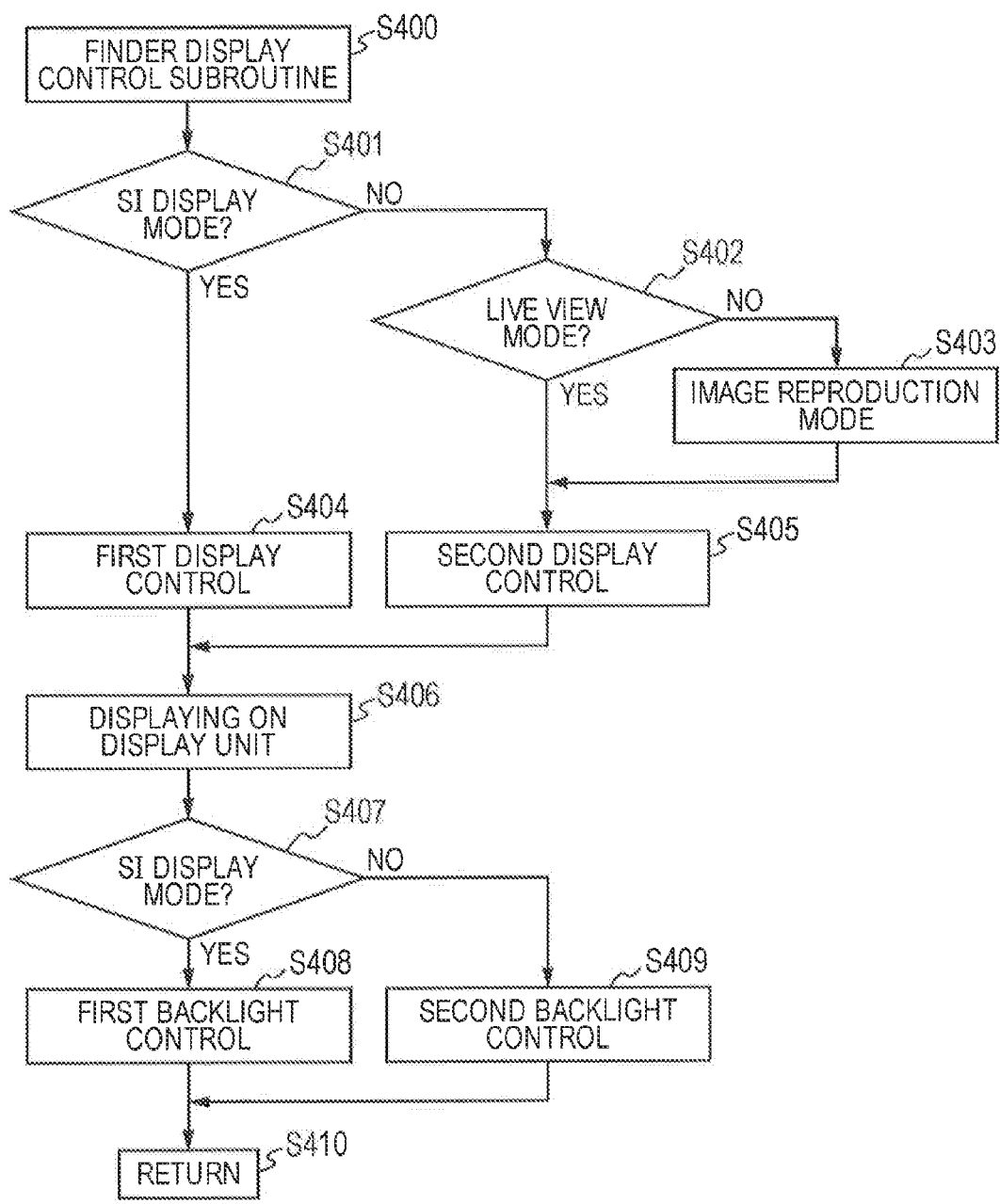
FIG. 4 is a flow chart illustrating a finder display control operation according to the embodiment of the present invention.

FIG. 4 is a flow chart illustrating a display control operation in the finder display device of the imaging apparatus according to the embodiment. A finder display control subroutine in Step S400 is a subroutine of a main routine to be executed by the CPU 101 in accordance with the control program stored in the ROM 202 of an imaging apparatus main body, and is arbitrarily invoked from the main routine to be executed. The main routine of the imaging apparatus is, for example, a routine for executing a photographing preparation operation for the object, the superimposed display in which photographic information or the like of the camera is superimposed on the optical object image, the display of the photographed live view image, the operation for photographing, and the signal processing, display, and recording of the photographing image. Note that, the main routine in the imaging apparatus falls within the common-sense category and has no direct relationship with the embodiment, and hence the details thereof are omitted here.

Firstly, in Step S401 of FIG. 4, the CPU 101 determines whether or not a finder display mode set in the imaging apparatus is a superimposed display (SI) mode (first display mode). In this processing, it is determined whether or not the optical image of the object is provided to the optical finder. When it is determined that the finder display mode is the superimposition display mode, the processing proceeds to Step S404, and first display control which is described later is carried out. On the other hand, when the finder display mode is not the superimposition display mode, the processing proceeds to Step S402, and it is determined whether or not the finder display mode is another display mode.

In Step S404, a preset image signal for display, for example, RGB values (255, 0, 0) (pixel value of red) each having 8 bits are set in a plurality of continuous pixels for displaying a rectangle having 30 pixels in width×40 pixels in height, five pixels in width at a central section of the XGA display. RGB signals having RGB values (0, 0, 0) are set in the pixels other than those pixels, and those image signals are input from the CPU 101 to the display control unit 211. Then, image signal correction processing based on the first display control is executed for the thus input RGB signals. After that, in Step S406, the focus detection region having a red quadrangular shape is displayed on a TFT display serving as the in-finder display unit 124 by the display control unit 211.

On the other hand, in Step S402, it is determined whether or not the set finder display mode is the live view display mode. When it is determined that the set finder display mode is the live view display mode, the processing proceeds to Step S405, and second display control is carried out. On the other hand, when the set finder display mode is not the live view display mode, the processing proceeds to Step S403, and it is determined whether or not the CPU 101 is in an image reproduction display mode (second display mode). However, regardless of which of the two display modes the display mode is, in Step S405, the display control unit 211 executes the image signal correction processing based on the second display control.

When it is determined that the set finder display mode is the live view display mode, in Step S405, the image signal corresponding to the image imaged by the imaging element 106 is input to the image processing unit 208 in the YUV signal format. The image signal input to the image processing unit 208 is subjected to image processing such as gamma conversion and color space conversion in the YUV signal state, and converted into the RGB signals each having 8 bits of R, G, and B, to thereby send the resulting RGB signals to the display control unit 211.

On the other hand, in the case of the image reproduction display mode, in Step S405, the image processing unit 208 executes the JPEG decompression processing for the image file read out from the data storing unit 104, and the resulting RGB image data is input to the display control unit 211.

The display control unit 211 executes the image signal correction processing such as color correction and brightness correction in the RGB color space for the RGB signals sent thereto, and subjects the resulting RGB signals to the gamma correction or the like, to thereby send the resulting signals to the in-finder display unit 124. Then, the second display control in Step S405 is completed.

The second display control is different from the above-mentioned first display control in processing (color balance processing) for changing the color and the brightness in the RGB color space by the display control unit 211. The color change is carried out by executing processing for multiplying the RBG signals by preset coefficients. When the input signals of RGB are represented by R0, G0, and B0, and the outputs after the color change are represented by R1, G1, and B1, for example, in the case of the first display control, R1=1.0×R0, G1=1.0×G0, and B1=1.0×B0 hold. In this case, because the coefficients are each set to 1.0, none of the color correction and the brightness correction is carried out. On the other hand, in the case of the second display control, for example, R1=R0×0.5, G1=G0×1.0, and B1=B0×1.4 hold. In such a manner, the color correction processing and the brightness correction processing are executed in which the intensity of the red color is reduced, and the intensity of the blue color is increased.

The image signal for which the first display control or the second display control has been carried out is displayed as the image on the TFT display serving as the in-finder display unit 124 in Step S406.

Next, in Step S407, the CPU 101 determines whether or not the display mode is the superimposition display mode. When it is determined that the display mode is the superimposition display mode, the processing proceeds to Step S408. Then, first backlight control is carried out as current control for the backlight LED 124a of the TFT display. On the other hand, when it is determined that the display mode is not the superimposition display mode, that is, when it is determined that the display mode is the live view display mode or the image reproduction display mode, the processing proceeds to Step S409, and the control for the brightness is carried out under second backlight control.

In the first backlight control, the current to the LED of the backlight unit 124a is controlled so that the brightness of a display mark such as the focus detection region displayed by the in-finder display unit 124 in the still image photographing mode can be sufficiently visually recognized with respect to the optical finder object light of the background. In other words, the control for increasing the current to the LED more as the object brightness becomes brighter is carried out.

In the second backlight control, because the light from the object is perfectly blocked by the withdrawing of the main mirror 123 from the optical path following the live view operation, the brightness cannot be detected by the photometric sensor 130. Then, because an outside light component in the circumference of the eyepiece of the camera is considered to affect the observation of the in-finder display unit 124, the LED current control of the backlight unit 124a is carried out by using an output from the eye detecting sensor 160. In this case, the areas except for the in-finder display unit 124 as the observation object are approximately in the dark state. Hence, the current control for the outside light is not carried out in the wide range because it is only necessary to cope with the brightness change in the circumference of the face looking into the finder. Moreover, even when the current value is kept constant, there is few practical problems in the second backlight control.

After the backlight control is carried out, in Step S410, the processing returns back to the main routine.

Although the exemplary embodiment of the present invention has been described so far, the present invention is not limited to the exemplary embodiment. In the description of the finder structure described above, in order to achieve both of the optical finder and the electronic view finder, the two triangular prisms bonded to each other are used, each of which has one reflective surface covered with the dichroic coat. However, for example, a structure may also be adopted in which a single dichroic mirror is simply disposed. In addition, the in-finder display unit 124 may not include the TFT display panel but include an organic EL display panel not requiring the backlight LED. In addition, in the present invention, the image signal correction processing for the color and the brightness of the image signal is executed in the display control unit 211. However, even when the image signal correction processing is executed in the image processing unit 208, finally, the same effects can be obtained. Therefore, various changes and modifications can be made within the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259279, filed on Dec. 16, 2013, which is hereby incorporated by reference herein in its entirety.

What is claimed is:

1. An imaging apparatus comprising:
an optical finder to be supplied with an optical image of an object;
a display configured to display image information as an electronic image;
an optical path combining unit configured to optically combine the optical image supplied to the optical finder and the electronic image displayed by the display with each other in an optical path of the optical finder; and
at least one processor or circuit configured to perform the operations of units comprising an image display processing unit configured to perform image display processing to the image information,
wherein the optical path combining unit includes an optical element which has first transmissivity in a first wavelength range of a visible light wavelength range, and has second transmissivity lower than the first transmissivity in a second wavelength range on a longer wavelength side than the first wavelength range, and
wherein, when the optical finder is not supplied with the optical image of the object, the image display processing unit reduces an intensity of a color of the second wavelength range to be lower than a first predetermined value and increases an intensity of a color of the first wavelength range to be higher than a second predetermined value, in regard to the electronic image.

2. The imaging apparatus according to claim 1, wherein, when the optical finder is not supplied with the optical image of the object, the image display processing unit reduces an intensity of a red color of the second wavelength range to be lower than the first predetermined value and increases an intensity of a blue color of the first wavelength range to be higher than the second predetermined value, in regard to the electronic image.

3. The imaging apparatus according to claim 1, wherein, when the optical finder is supplied with the optical image of the object, the image display processing unit does not change the intensities of the respective colors of the first and second wavelength ranges in regard to the electronic image.

4. A method of controlling an imaging apparatus which comprises (1) an optical finder, (2) a display, (3) an optical path combining unit, and (4) an image display processing unit, the method comprising:
supplying an optical image of an object to the optical finder;
displaying, by the display, image information as an electronic image;
optically combining, by the optical path combining unit, the optical image supplied to the optical finder and the electronic image displayed by the display with each other in an optical path of the optical finder; and
performing, by the image display processing unit, image display processing to the image information,
wherein an optical element is provided to serve as the optical path combining unit, has first transmissivity in a first wavelength range of a visible light wavelength range, and has second transmissivity lower than the first transmissivity in a second wavelength range on a longer wavelength side than the first wavelength range, and
wherein, when the optical finder is not supplied with the optical image of the object, an intensity of a color of the second wavelength range is reduced by the image display processing unit to be lower than a first predetermined value and an intensity of a color of the first wavelength range is increased by the image display processing unit to be higher than a second predetermined value, in regard to the electronic image.

* * * * *